(12) United States Patent
Tomosada et al.

(10) Patent No.: US 12,391,196 B2
(45) Date of Patent: Aug. 19, 2025

(54) PROTECTOR AND WIRE HARNESS

(71) Applicant: YAZAKI CORPORATION, Tokyo (JP)

(72) Inventors: Kosuke Tomosada, Makinohara (JP); Naoto Kogure, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 53 days.

(21) Appl. No.: 18/451,756

(22) Filed: Aug. 17, 2023

(65) Prior Publication Data
US 2024/0083371 A1  Mar. 14, 2024

(30) Foreign Application Priority Data
Sep. 14, 2022 (JP) ................................ 2022-145825

(51) Int. Cl.
*B60R 16/02* (2006.01)

(52) U.S. Cl.
CPC ...... *B60R 16/0222* (2013.01); *B60R 16/0215* (2013.01)

(58) Field of Classification Search
CPC .. B60R 16/0215; B60R 16/0222; H02G 3/32; H02G 3/0418; H02G 3/0437; H02G 11/00; H02G 11/06; H01B 13/01263
See application file for complete search history.

(56) References Cited

U.S. PATENT DOCUMENTS

| | | | | |
|---|---|---|---|---|
| 2,424,759 A | * | 7/1947 | Klumpp, Jr. | H02G 3/0675 174/153 G |
| 3,424,856 A | * | 1/1969 | Coldren | H02G 3/0633 16/2.5 |
| 3,449,687 A | * | 6/1969 | Evel | H03F 3/45381 330/253 |
| 5,562,478 A | * | 10/1996 | Yamamoto | H01R 4/2433 439/417 |
| 8,586,880 B2 | * | 11/2013 | Zhang | H02G 3/083 174/650 |
| 9,425,545 B2 | * | 8/2016 | Bedal | H01R 4/12 |
| 11,895,814 B1 | * | 2/2024 | Lee | B60R 16/0215 |
| 2014/0027150 A1 | * | 1/2014 | Gundel | H01B 7/0838 174/102 R |

(Continued)

FOREIGN PATENT DOCUMENTS

| | | | | |
|---|---|---|---|---|
| GB | 1528002 A | * | 10/1978 | ............... F16B 2/22 |
| JP | H01-180807 U | | 12/1989 | |

(Continued)

*Primary Examiner* — Paresh Paghadal
(74) *Attorney, Agent, or Firm* — KENEALY VAIDYA LLP

(57) ABSTRACT

A protector applied to a wire harness includes: a base member that includes a housing space part that is formed with a wall part and in which wiring materials are inserted and an opening part that allows the housing space part to communicate with outside; and a cover member that closes the opening part by being assembled to the base member. The cover member, in a state of being assembled to the base member, includes a positioning part that is formed to protrude toward the housing space part side and abuts against the wiring materials housed in the housing space part. The positioning part is capable of correcting positions of the wiring materials, in a state of being assembled to the base member.

4 Claims, 3 Drawing Sheets

(56) References Cited

U.S. PATENT DOCUMENTS

| | | | |
|---|---|---|---|
| 2015/0101837 A1* | 4/2015 | Evangelista | H02G 15/113 |
| | | | 29/525 |
| 2019/0013654 A1 | 1/2019 | Suenaga | |
| 2020/0112152 A1* | 4/2020 | Ide | H02G 3/0418 |
| 2020/0274130 A1* | 8/2020 | Chen | H01M 50/528 |
| 2022/0161742 A1* | 5/2022 | Saito | H01B 7/18 |

FOREIGN PATENT DOCUMENTS

| | | | | |
|---|---|---|---|---|
| JP | 2014023384 A | * | 2/2014 | ............... H02G 3/04 |
| JP | 2015-119530 A | | 6/2015 | |
| JP | 6198183 B2 | | 9/2017 | |

\* cited by examiner

PROTECTOR AND WIRE HARNESS

CROSS-REFERENCE TO RELATED APPLICATION(S)

The present application claims priority to and incorporates by reference the entire contents of Japanese Patent Application No. 2022-145825 filed in Japan on Sep. 14, 2022.

BACKGROUND OF THE INVENTION

1. Field of the Invention

The present invention relates to a protector and a wire harness.

2. Description of the Related Art

For example, Japanese Patent No. 6198183 discloses a protector that includes a protector main body (base member) extending in a gutter shape and a lid body (cover member) assembled to the protector main body.

By the way, although the protector described in the above-mentioned Japanese Patent No. 6198183 can hold wiring materials with the base member, it is difficult to dispose the wiring materials in a prescribed position within the base member, and the wiring materials may pop out from an opening part of the base member when a cover member is assembled to the base member. Therefore, there is a need for a configuration capable of holding and housing the wiring material in an appropriate position within the base member.

SUMMARY OF THE INVENTION

The present invention is designed in view of the aforementioned circumstances, and it is an object thereof to provide a protector and a wire harness capable of holding and housing wiring materials in an appropriate position.

In order to achieve the above mentioned object, a protector according to one aspect of the present invention includes a base member that includes a housing space part that is formed with a wall part and in which wiring materials exhibiting conductivity are inserted and an opening part that allows the housing space part to communicate with outside; and a cover member that is capable of closing the opening part by being assembled to the base member, wherein the cover member, in a state of being assembled to the base member, includes a positioning part that is formed to protrude toward the housing space part side, the positioning part abutting against the wiring materials housed in the housing space part, and the positioning part is capable of correcting positions of the wiring materials, in a state where the cover member is being assembled to the base member.

In order to achieve the above mentioned object, a wire harness according to another aspect of the present invention includes wiring materials exhibiting conductivity; and a protector that includes a base member including a housing space part that is formed with a wall part and in which the wiring materials are inserted and an opening part that allows the housing space part to communicate with outside, and a cover member that closes the opening part by being assembled to the base member, wherein the cover member, in a state of being assembled to the base member, includes a positioning part that is formed to protrude toward the housing space part side, the positioning part abutting against the wiring materials housed in the housing space part, and the positioning part is capable of correcting positions of the wiring materials, in a state of being assembled to the base member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments according to the present invention will be described in detail with reference to the accompanying drawings. Note, however, that the present invention is not limited by the embodiments. Furthermore, structural components in the following embodiments include those that can be easily replaced by those skilled in the art, or those that are substantially the same.

First Embodiment

Figure 1:
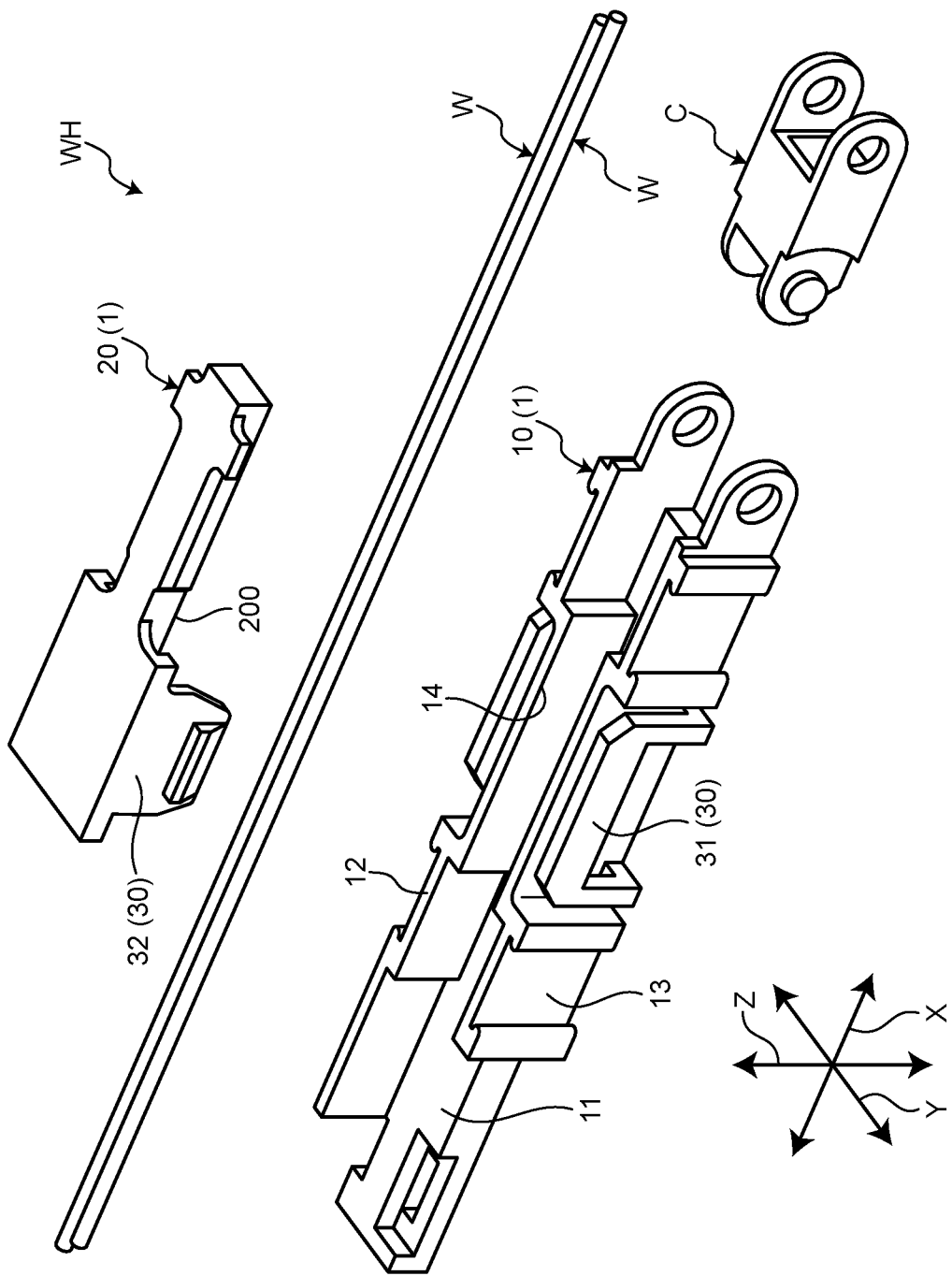
FIG. 1 is an exploded perspective view illustrating a schematic configuration of a wire harness to which a protector according to a first embodiment is applied.

A wire harness WH illustrated in FIG. 1 is, for example, configured as an aggregate component formed with a bundle of a plurality of wiring materials W used for power supply and signal communication so as to connect the wiring materials W to each device by a connector or the like for connecting each of the devices loaded on a vehicle.

The wire harness WH includes the wiring materials W, a protector 1, and a caterpillar-shaped sheathing material C that is assembled to the protector 1. In addition, the wire harness WH may further include a grommet, a fixture, a connector, and the like.

The wiring material W is, for example, an insulated electric wire with the core wire, which is a bundle of a plurality of conductive metal element wires, covered with an insulation coating part. Note that the wiring material W may be a bundle of a plurality of insulated electric wires. Furthermore, the wiring material W may be an insulated metal rod, which is a conductive metal rod covered with an insulation coating part.

The sheathing material C is formed with an insulation resin material or the like, a plurality of which are connected into a long shape. As illustrated in FIG. 1, the sheathing material C is attached to an end part of the protector 1, and protects the wiring material W by having the wiring material W inserted into the inside thereof. The wiring material W is connected to movable components such as a sliding door, a sliding seat, and a sunroof, and the extending direction thereof changes in accordance with the movement of the corresponding movable components. The caterpillar-shaped sheathing material C is used as a member that is capable of guiding the wiring material W from the protector 1 to the movable component while holding the wiring material W in a straight state or a bent state.

The protector 1 is formed with an insulation resin material or the like, and houses the wiring material W so as to protect the wiring material W. The protector 1 is fixed to the vehicle to be used as a member that regulates the routing path of the wiring material W. As illustrated in FIG. 1, the protector 1 includes a base member 10 having a housing space part 10S through which the wiring material W is inserted, and a cover member 20 that is assembled to the base member 10.

Furthermore, the protector 1 of the present embodiment is provided with a positioning part 200 in the cover member 20 as a structure for holding and housing the wiring material W in an appropriate position to implement a configuration that is capable of correcting the position of the wiring material W when assembled to the base member 10. Hereinafter, each structure of the protector 1 will be described in detail by referring to FIG. 1 to FIG. 3.

In the description hereinafter, in regards to a first direction, a second direction, and a third direction intersecting with each other, the first direction is referred to as a "length direction X", the second direction as a "width direction Y", and the third direction as a "height direction Z". The length direction X, the width direction Y, and the height direction Z are orthogonal to each other. The length direction X typically corresponds to an insertion direction or the like of the wiring material W with respect to the protector 1. Furthermore, the height direction Z corresponds to an attachment/detachment direction of the cover member 20 with respect to the base member 10, and an opening direction or the like of an opening part 14 (described later) of the base member 10. Unless otherwise noted, each of the directions used in the following description will be described as the direction in a state where each part of the protector 1 is being mounted.

Furthermore, the upper side in the height direction Z corresponds to the side where the cover member 20 is positioned, or the like, in a state where each part of the protector 1 is being mounted. The lower side in the height direction Z corresponds to the side where the base member 10 is positioned, or the like, in a state where each part of the protector 1 is being mounted.

Figure 2:
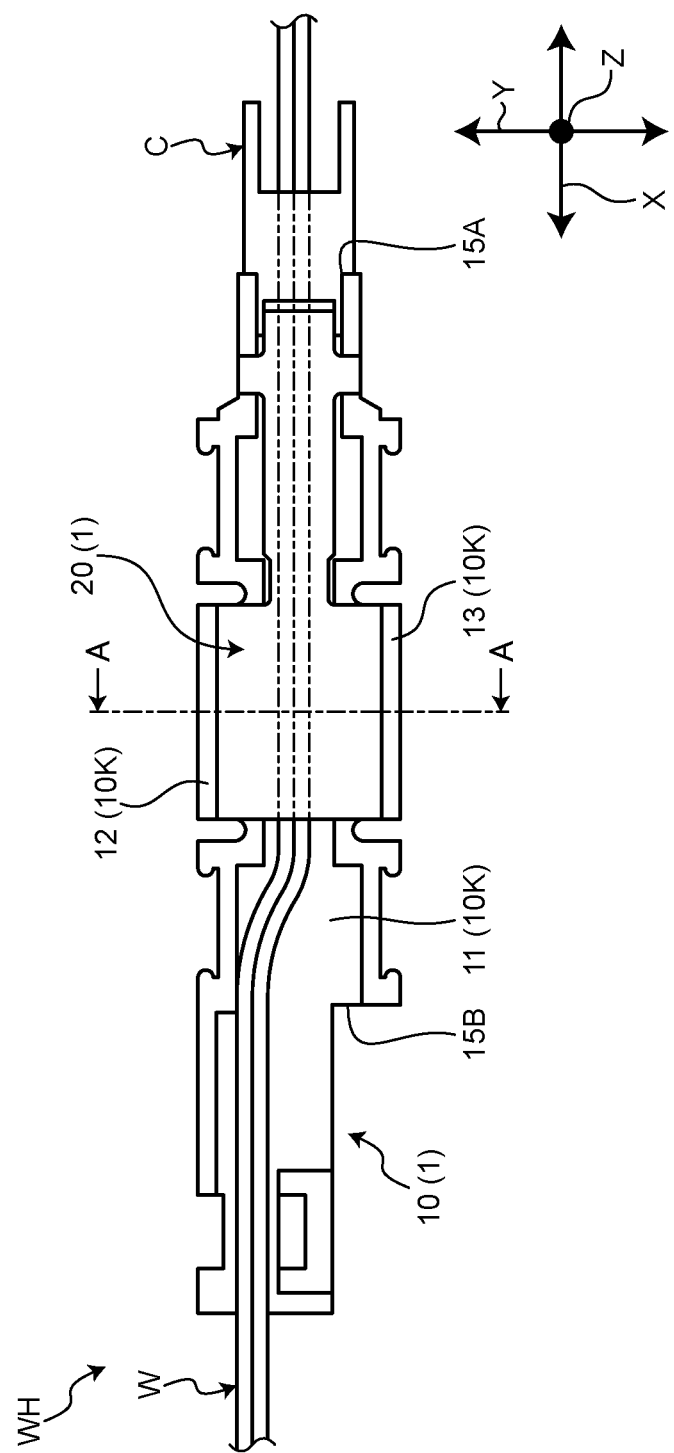
FIG. 2 is a top view illustrating a schematic configuration of the wire harness to which the protector according to the first embodiment is applied.
Figure 3:
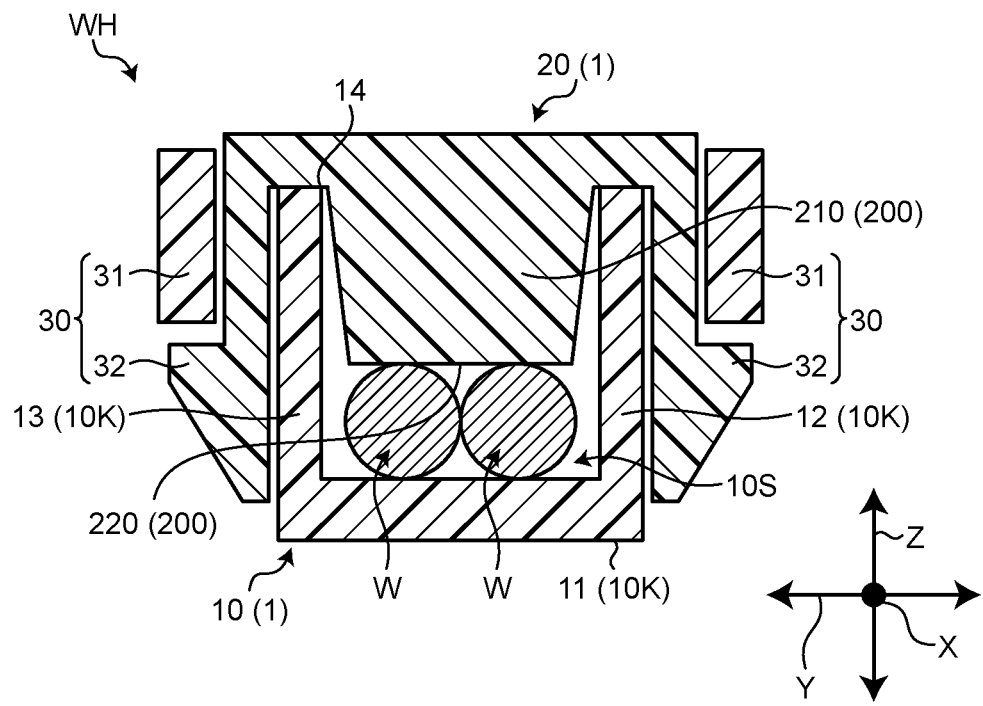
FIG. 3 is a sectional view illustrating a schematic configuration of the wire harness to which the protector according to the first embodiment is applied.

The base member 10 is configured including, as a wall part 10K, a bottom wall part 11 and sidewall parts 12, 13 as illustrated in FIG. 1 to FIG. 3. The base member 10 is formed integrally with the bottom wall part 11 and the sidewall parts 12, 13 to have a U-shaped cross section along the height direction Z. Therefore, the base member 10 includes the housing space part 10S (see FIG. 1 and FIG. 3) as an interior space, the opening part 14 that opens in the height direction Z (see FIG. 1 and FIG. 3), and insertion opening parts 15A and 15B (see FIG. 2) that open in the length direction X.

The bottom wall part 11 extends along the length direction X and the width direction Y and is formed in a substantially rectangular plate shape with the height direction Z being the thickness direction, which is disposed opposing to the opening part 14 with a space provided therebetween in the height direction Z that is the opening direction of the opening part 14.

The sidewall parts 12 and 13 extend along the length direction X and the height direction Z and are formed in a substantially rectangular plate shape with the width direction Y being the thickness direction, which are disposed opposing to each other with a space provided therebetween in the width direction Y that intersects with the opening direction of the opening part 14. Furthermore, the sidewall parts 12 and 13 are connected to both end parts of the bottom wall part 11 in the width direction Y, respectively. More specifically, the sidewall part 12 is erected along the height direction Z from one end part of the bottom wall part 11 in the width direction Y, and the sidewall part 13 is erected along the height direction Z from the other end part of the bottom wall part 11 in the width direction Y. Note that each of the sidewall parts 12 and 13 herein may be formed in various shapes including a recessed portion, a protruded portion, a curved portion, or a bent portion.

The housing space part 10S is an area sectioned and formed by the bottom wall part 11 and a pair of sidewall parts 12, 13. The protector 1 is capable of routing the wiring material W along the length direction X by inserting the wiring material W into the housing space part 10S through the insertion opening parts 15A and 15B positioned at the end parts in the length direction X. Note that the housing space part 10S herein means the area that can hold the wiring material W by any of the bottom wall part 11, the sidewall part 12, and the sidewall part 13. Therefore, the housing space part 10S includes a space surrounded by a plurality of wall parts, a space sectioned by wall parts positioned opposing to each other, a space positioned along the wall face of one wall part, and the like.

The opening part 14 is the area sectioned and formed by the pair of sidewall parts 12 and 13, and it is the area sandwiched by the end parts of each of the sidewall parts 12 and 13 positioned on the upper side in the height direction Z. In the protector 1 according to the present embodiment, when the cover member 20 is assembled to the base member 10, part of the opening part 14 is blocked by the cover member 20, and part of the housing space part 10S positioned corresponding to the opening part 14 is covered. Therefore, the protector 1 includes: an area that holds the wiring material W by housing the wiring material W in the internal space surrounded by the wall part 10K of the base member 10 and a wall part 20K (described later) of the cover member 20; and an area that holds the wiring material W only by the wall part 10K.

The insertion opening parts 15A, 15B are the areas sectioned and formed by the pair of sidewall parts 12, 13, which are the areas sandwiched by the end parts positioned on the base end side (left side in FIG. 2) and the tip side (right side in FIG. 2) of each of the sidewall parts 12, 13 in the length direction X.

On the other hand, the cover member 20 is configured with the wall part 20K, as illustrated in FIG. 1 to FIG. 3. The cover member 20, when assembled to the base member 10, extends from one sidewall part 12 to the other sidewall part 13 and is formed in a size capable of closing the opening part 14 of the base member 10 in the width direction Y. Furthermore, the cover member 20 can partially close the opening part 14 along the length direction X, and it is formed in a plate shape with the height direction Z being the thickness direction when the opening part 14 is being closed (see FIG. 2 and the like). In this state, the cover member 20 is held in a closing position for closing the opening part 14 of the base member 10 by being engaged to each of the sidewall parts 12 and 13 of the base member 10 via a locking mechanism 30, and it is positioned opposing to the bottom wall part 11 with a space provided therebetween in the height direction Z.

Note that the locking mechanism 30 is configured including: a plurality of locking pieces 31 provided to each of the sidewall parts 12 and 13 of the base member 10; and locked pieces 32 provided to the cover member 20 to correspond to each of the locking pieces 31 (see FIG. 1, FIG. 3, and the like). The base member 10 can lock the cover member 20 via the locking mechanism 30 by engaging the protruded parts formed in the locked pieces 32 of the cover member 20 with the hole parts formed in each of the locking pieces 31.

Next, the configuration of a positioning part 200 provided in the cover member 20 will be described.

The positioning part 200 is a part formed to protrude from the inner face side of the cover member 20. The positioning part 200 has a protruded part 210 and a pressing plane part 220 provided at the tip part of the protruded part 210, as illustrated in FIG. 3.

The protruded part 210 extends along the length direction X and extends across between the pair of sidewall parts 12 and 13 with respect to the width direction Y, when the cover member 20 is being assembled to the base member 10. Furthermore, the protruded part 210 is formed in the height direction Z along each of the sidewall parts 12 and 13, when the cover member 20 is being assembled to the base member 10. Therefore, when the cover member 20 is assembled to the base member 10, the housing space part 10S of the base member 10 is narrowed by the protruded part 210.

The pressing plane part 220 extends along the length direction X and the width direction Y and is positioned facing the bottom wall part 11 of the base member 10, when the cover member 20 is being assembled to the base member 10. Therefore, when the cover member 20 is assembled to the base member 10, the height of the housing space part 10S of the base member 10 is narrowed by the pressing plane part 220 of the protruded part 210. The height (distance from the bottom wall part 11 to the pressing plane part 220) is narrowed to a prescribed height with which each of the wiring materials W can be inserted.

Next, an operation when assembling the protector 1 will be described.

First, an operator assembles a plurality of wiring materials W to the base member 10. Then, the operator assembles the cover member 20 to the base member 10 in a state where each of the wiring materials W are being inserted into the housing space part 10S of the base member 10. At this time, the positioning part 200 of the cover member 20, when inserted from the opening part 14 of the base member 10, is pushed in toward the bottom wall part 11 side of the base member 10 with the pressing plane part 220 being abutted against each of the wiring materials W housed in the housing space part 10S. Therefore, the cover member 20 can place each of the wiring materials W housed in the housing space part 10S toward the bottom wall part 11 side of the base member 10 via the positioning part 200. As a result, with the protector 1 in which the cover member 20 is assembled to the base member 10 in this manner, it is possible to correct the positions of the wiring materials W in the housing space part 10S by disposing each of the wiring materials W between the positioning part 200 of the cover member 20 and the bottom wall part 11 of the base member 10, and sandwiching the wiring materials W with the positioning part 200 and the bottom wall part 11. More specifically, in the protector 1, when the cover member 20 is assembled to the base member 10, the height of the housing space part 10S is narrowed by the pressing plane part 220 of the protruded part 210. The height is narrowed down to a height equivalent to the height of the wiring materials W. Therefore, in the protector 1, each of the wiring materials W can be disposed side by side along the width direction Y in a state where the cover member 20 is being assembled to the base member 10 (see FIG. 3).

Furthermore, in the protector 1, it is possible to close the opening part 14 of the base member 10 against the width direction Y by the positioning part 200 of the cover member 20, when the cover member 20 is assembled to the base member 10. Therefore, the cover member 20 can prevent each of the wiring materials W housed in the housing space part 10S from moving toward the opening part 14 and popping out from the opening part 14 to the outside.

The wire harness WH described above includes: the wiring materials W exhibiting conductivity; and the protector 1 that includes: the base member 10 having the housing space part 10S which is formed with the wall part 10K and into which the wiring materials W are inserted, and the opening part 14 that allows the housing space part 10S to communicate with the outside; and the cover member 20 that closes the opening part 14 by being assembled to the base member 10. Furthermore, the cover member 20, in a state of being assembled to the base member 10, includes the positioning part 200 that is formed to protrude toward the housing space part 10S side and abuts against the wiring materials W housed in the housing space part 10S. The positioning part 200 can correct the position of the wiring material W in a state of being assembled to the base member 10.

According to such a configuration, the wire harness WH and the protector 1 can press each of the wiring materials W housed in the housing space part 10S from the opening part 14 side by pushing in the positioning part 200 of the cover member 20 from the opening part 14 of the base member 10. Therefore, the wire harness WH and the protector 1 can hold and house the wiring materials W in an appropriate position within the housing space part 10S.

Furthermore, the wire harness WH and the base member 10 of the protector 1 described above include, as the wall part 10K, the bottom wall part 11 positioned opposing to the opening part 14 in the opening direction (height direction Z) of the opening part 14, and the pair of sidewall parts 12 and 13 extending from both end parts of the bottom wall part 11 and opposing to each other in the width direction Y that intersects with the height direction Z. Furthermore, the positioning part 200 includes: the protruded part 210 which extends across between the pair of sidewall parts 12, 13 with respect to the width direction Y and which is formed along each of the sidewall parts 12, 13 with respect to the height direction Z in a state where the cover member 20 is being assembled to the base member 10; and the pressing plane part 220 that is provided at the tip part of the protruded part 210 and positioned facing the bottom wall part 11 in a state where the cover member 20 is being assembled to the base member 10. Each of the wiring materials W is disposed side by side along the width direction Y between the pressing plane part 220 and the bottom wall part 11 in a state where the cover member 20 is being assembled to the base member 10. According to such a configuration, the wire harness WH and the protector 1 can prevent each of the wiring materials W from moving toward the opening part 14 and popping out from the opening part 14 to the outside by placing each of the wiring materials W housed in the housing space part 10S to the bottom wall part 11 side via the protruded part 210 of the positioning part 200. Furthermore, the wire harness WH and the protector 1 can correct the position of the wiring materials W via the pressing plane part 220 of the protruded part 210 such that each of the wiring materials W is disposed along a prescribed direction within the housing space part 10S. Therefore, the wire harness WH and the protector 1 can prevent the wiring materials W from tangling with each other when each of the wiring materials W moves within the housing space part 10S because the movable component to which the wiring materials W are connected is operated. Therefore, the wire harness WH and the protector 1 can hold and house the wiring materials W in an appropriate position within the housing space part 10S.

Second Embodiment

Next, a wire harness WHA according to a second embodiment will be described. The wire harness WHA differs from the wire harness WH and the protector 1 according to the first embodiment described above in terms of the shape of a positioning part 200A provided to a cover member 20A of a protector 1A. In the second embodiment, the same reference signs are applied to the same structural components as those of the first embodiment, and their detailed descriptions thereof are omitted.

Figure 4:
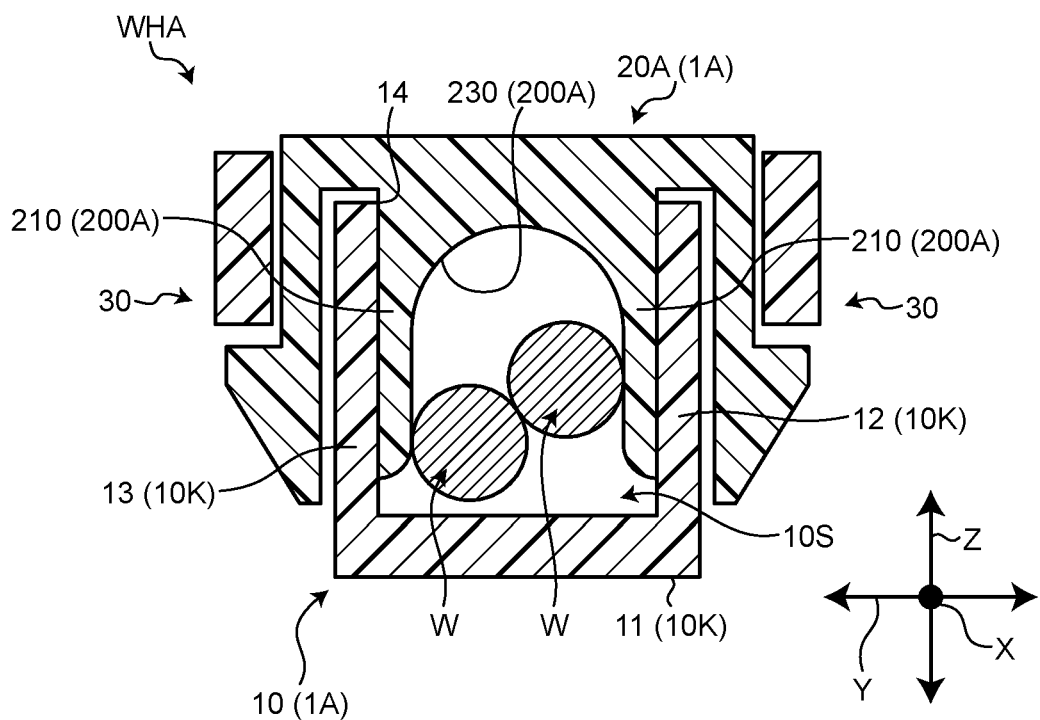
FIG. 4 is a sectional view illustrating a schematic configuration of a wire harness to which a protector according to a second embodiment is applied.

The positioning part 200A is a part formed to protrude from the inner face side of the cover member 20A. The positioning part 200A has the protruded part 210 and a notch part 230 provided at the tip side of the protruded part 210, as illustrated in FIG. 4.

The notch part 230 is formed from the tip side of the protruded part 210 toward the based end side, and it is a groove part formed from the bottom wall part 11 side of the base member 10 toward the opening part 14 side in a state where the cover member 20 is being assembled to the base member 10. The protruded part 210 with the groove part formed therein has a U-shaped cross section along the height direction Z, and a pair of protrusions are formed on both sides by sandwiching the notch part 230. Therefore, when the cover member 20 is assembled to the base member 10, the housing space part 10S of the base member 10 is narrowed by the protruded part 210, and the housing space part 10S is turned into a space part (inner side of the notch part 230) surrounded by the notch part 230.

According to such a configuration, the wire harness WHA and the protector 1A can prevent each of the wiring materials W from moving toward the opening part 14 and popping out from the opening part 14 to the outside by guiding each of the wiring materials W housed in the housing space part 10S of the base member 10 to the inside of the notch part 230 and placing them to the center side of the housing space part 10S. Therefore, the wire harness WHA and the protector 1A can hold and house the wiring materials W in an appropriate position within the housing space part 10S.

Note that the protectors 1, 1A, and the wire harnesses WH, WHA according to the embodiments of the present invention described above are not limited to the embodiments described above, and various changes are possible within the scope of the appended claims.

For example, while the positioning part is described to be formed in the length direction X and formed from one insertion opening part to the other insertion opening part formed by the base member when the cover member is assembled to the base member, there is no specific limit set for the position of the positioning part with respect to the length direction X.

Furthermore, the positioning part may not include the pressing plane part, and may not include the notch part.

The protector and the wire harness according to the present embodiments may be configured by combining the structural components of the embodiments and modification examples described above as appropriate.

The protector and the wire harness according to the present embodiments can achieve such an effect that the wiring materials can be held and housed in an appropriate position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector comprising:
a base member that includes a housing space part that is formed with a wall part and in which wiring materials exhibiting conductivity are inserted and an opening part that allows the housing space part to communicate with outside; and
a cover member that is capable of closing the opening part by being assembled to the base member, wherein
the cover member, in a state of being assembled to the base member, includes a positioning part that is formed to protrude toward the housing space part side, the positioning part abutting against the wiring materials housed in the housing space part, and
the positioning part is capable of correcting positions of the wiring materials, in a state where the cover member is being assembled to the base member,
the base member includes, as the wall part: a bottom wall part that is positioned opposing to the opening part in an opening direction of the opening part; and a pair of sidewall parts extending from both ends of the bottom wall part and opposing to each other in a width direction that intersects with the opening direction,
the base member includes a first insertion opening and a second insertion opening spaced away from the first insertion opening, the first insertion opening and the second insertion opening are bound by the pair of sidewalls and the bottom wall,
the wiring materials extend through each of the first insertion opening, the second insertion opening, and the housing space part,
the bottom wall is flat from the first insertion opening to the second insertion opening, and
the cover member includes a pair of flanges protruding outwardly from the positioning part, each of the flanges extends over a respective one of the sidewall parts.

2. The protector according to claim 1, wherein
the positioning part includes: a protruded part extending across between the pair of sidewall parts with respect to the width direction, the protruded part being formed along each of the sidewall parts with respect to the opening direction, in a state where the cover member is being assembled to the base member; and a pressing plane part provided at a tip part of the protruded part, the pressing plane part being positioned facing the bottom wall part in a state where the cover member is being assembled to the base member, and each of the wiring materials is disposed side by side along the width direction between the pressing plane part and the bottom wall part in a state where the cover member is being assembled to the base member.

3. The protector according to claim 1, wherein
the positioning part includes: a protruded part extending across between the pair of sidewall parts with respect to the width direction, the protruded part being formed along each of the sidewall parts with respect to the opening direction, in a state where the cover member is being assembled to the base member; and a notch part provided in the protruded part, the notch part being formed from a tip side toward a base end side, each of the wiring materials being disposed on an inner side of the notch part in a state where the cover member is being assembled to the base member.

4. A wire harness comprising:

wiring materials exhibiting conductivity; and a protector that includes a base member including a housing space part that is formed with a wall part and in which the wiring materials are inserted and an opening part that allows the housing space part to communicate with outside, and a cover member that closes the opening part by being assembled to the base member, wherein the cover member, in a state of being assembled to the base member, includes a positioning part that is formed to protrude toward the housing space part side, the positioning part abutting against the wiring materials housed in the housing space part, and the positioning part is capable of correcting positions of the wiring materials, in a state where the cover member is being assembled to the base member, the base member includes, as the wall part: a bottom wall part that is positioned opposing to the opening part in an opening direction of the opening part; and a pair of sidewall parts extending from both ends of the bottom wall part and opposing to each other in a width direction that intersects with the opening direction, the base member includes a first insertion opening and a second insertion opening spaced away from the first insertion opening, the first insertion opening and the second insertion opening are bound by the pair of sidewalls and the bottom wall, the wiring materials extend through each of the first insertion opening, the second insertion opening, and the housing space part, the bottom wall is flat from the first insertion opening to the second insertion opening, and the cover member includes a pair of flanges protruding outwardly from the positioning part, each of the flanges extends over a respective one of the sidewall parts.

* * * * *